Dec. 22, 1942.  B. P. ROBERTS  2,305,900
TRIMMING MACHINE AND CORE
Filed July 31, 1939   3 Sheets-Sheet 1
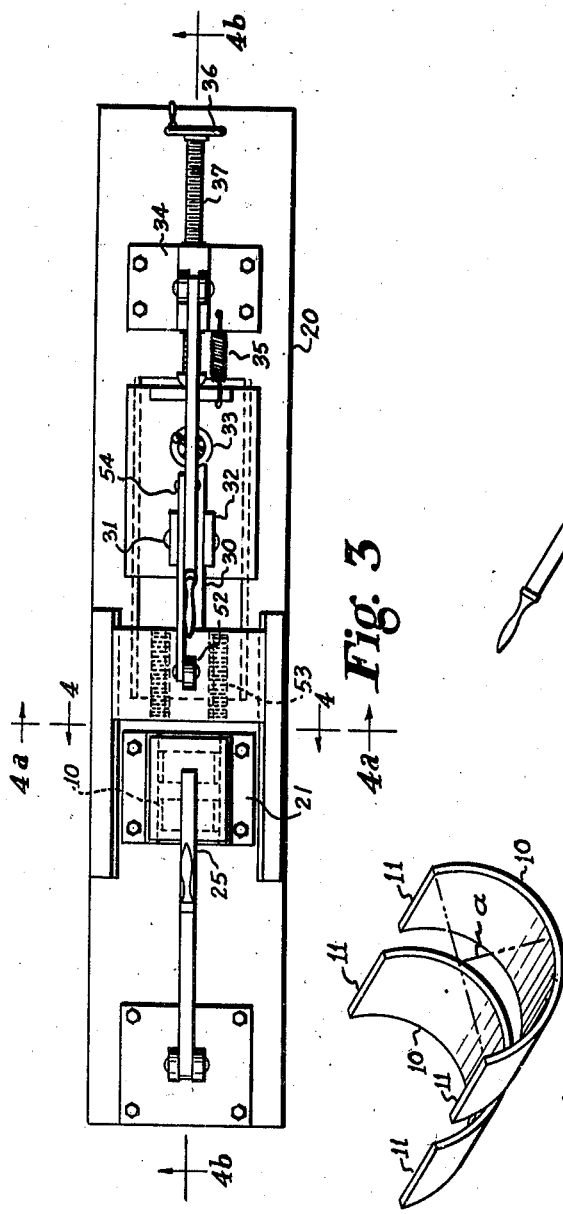
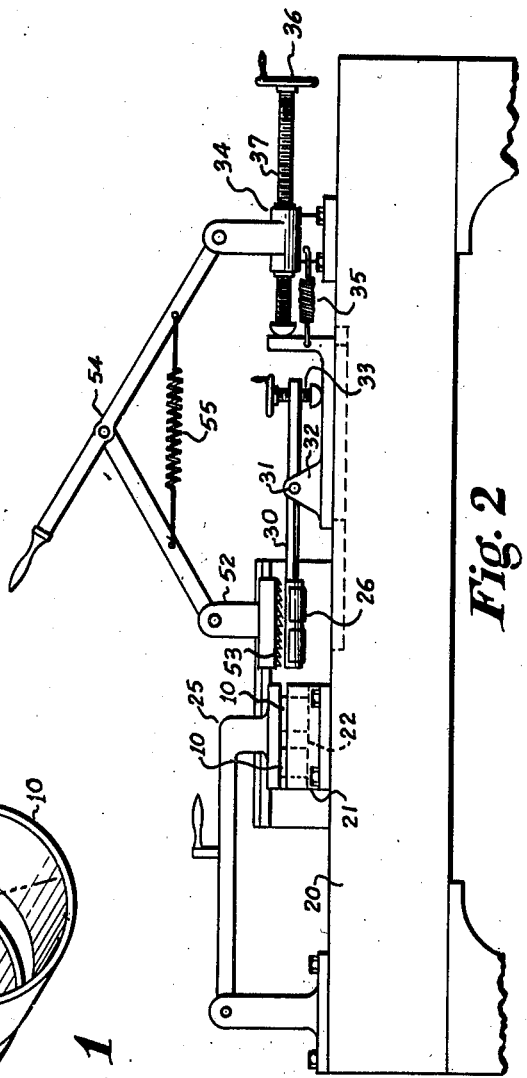
INVENTOR.
Benjamin Philip Roberts
BY Daniel G. Cullen
ATTORNEY.

Dec. 22, 1942. B. P. ROBERTS 2,305,900
TRIMMING MACHINE AND CORE
Filed July 31, 1939 3 Sheets-Sheet 2

INVENTOR.
Benjamin Philip Roberts
BY
Daniel G. Cullen
ATTORNEY.

Dec. 22, 1942.  B. P. ROBERTS  2,305,900
TRIMMING MACHINE AND CORE
Filed July 31, 1939  3 Sheets-Sheet 3

INVENTOR.
Benjamin Philip Roberts
BY Daniel G. Cullen
ATTORNEY.

Patented Dec. 22, 1942

2,305,900

UNITED STATES PATENT OFFICE 2,305,900

TRIMMING MACHINE AND CORE

Benjamin Philip Roberts, Detroit, Mich., assignor to Detroit Aluminum & Brass Corporation, Detroit, Mich., a corporation of Michigan Application July 31, 1939, Serial No. 287,576

28 Claims. (Cl. 90—33)

This application relates to the art of trimming or machining the elemental edges of a part in the form of a semi-circular hollow cylinder.

In the manufacture of such parts it has been considered necessary to trim the elemental edges to a predetermined dimensional relation with respect to the depth semi-diameter of the part. Machines for this purpose have long been known. Such machines generally comprise a horizontal bed having a horizontal cylindrical groove in which the part is placed with its edges upward and projecting slightly above the corresponding edges or top surface of the grooved bed. The part is placed in the bed with its edges upwardly and cutter or trimmer blades are then reciprocated over the elemental edges of the part when it is held in the groove of the bed to trim the edges. By predetermining the distance between the trimmer blades and the base of the groove, there is accomplished a trimming of the edges of the part to the desired dimensional relation with respect to the base of the groove and thus with respect to the depth semi-diameter of the part.

In conjunction with the trimming operation it is necessary to provide some means for firmly holding the part within the groove. Machines heretofore known have employed such a part, known as a core, generally in the nature of a cylindrical or semi-cylindrical block adapted to be placed within the part and pressed firmly against it and thus to press the part firmly against the grooved bed. In known machines the core was advanced endwise into the part through an open end until it aligned with the part and then the core was shifted downwardly to engage and clamp the part in place.

This application relates particularly to improvements in machines of this character and more specifically to improvements in the form of core.

One improvement resides in the provision of a core so formed as to enable it to be used satisfactorily with two adjacent parts disposed in end to end relation, longitudinally spaced or not, as desired, whereby a single reciprocation of the trimmer will cause a trimming of the four edges of two parts simultaneously, as contrasted from machines heretofore known which were constructed to receive but one part during the trimming operation and in which but two edges of one part were trimmed in one operation.

Another improvement resides in so forming the core that it will adjust itself to variations in contour of the inner wall of the part, whereby the clamping pressure of the core will not only clamp the part in place in the grooved bed, but in addition, will distort the part if necessary and cause it to conform to and assume the shape of the groove at least during the trimming operation, thus assuring the trimming of the edges to a complete and satisfactory predetermined relation with respect to the contour of the grooved bed.

To explain the distortion of the part during the time it is clamped in the grooved bed reference is made to the following: Let the radius of curvature of the external surface of the part, when the part is in use, as when it is used as one-half of a bearing for a shaft in a bearing support, equal R; let R1 be the radius of curvature of the bed groove; R1 will equal R, because during the trimming operation the part is distorted to fit that groove tightly, just as the part is distorted to fit the bearing support when it is used as a bearing. During sizing and trimming the part is maintained in the size and shape it is intended to assume when it is used. Let the radius of curvature of the part before it is clamped and distorted in the bed groove, be equal to R2. Now if R2 is less than R1, the form of clamp here shown will not distort or expand the part to conform to the bed groove and thus possible rocking of the part while its edges are being trimmed is not prohibited. But is R2 is greater than R1, the form of clamp here shown will force the part into the groove and the part will be contracted and distorted to conform to the bed groove and will be prohibited from possible rocking while its edges are being trimmed. If R2 were equal to R1, exactly, the part will not be distorted but by being clamped will be prohibited from being rocked during trimming. But since it is impossible, with the thin parts used, to have all parts as they come to the trimmer, have their radii equal exactly to R1, some certainly being smaller, and since parts having their radii smaller than R1 may "wobble" in the bed groove, it is desirable, as a practical matter, to have all parts formed with their radii larger than R1. Thus, all parts, when clamped in a grooved bed whose radius is less than the radii of the parts, will be distorted and contracted and prevented from "wobbling" while being trimmed.

It may also be mentioned that long before my invention hereof it was determined that the radii R2 of the parts when not in use should, in all cases, be greater than the radii R of the parts when in use. Thus, by determining that the bed groove radius R1 should be equal to R, it necessarily follows from the fact that R2 will in all cases be greater than R, that R2 will in all cases be greater than R1. The form of clamp here shown, when used with a part whose R2 is greater than R1 and with a bed groove R1, will necessarily cause the part to be distorted by contraction until its R2 will equal R1, at least during the trimming operation. This action could not take place where R2 is exactly equal to R1 or less than R1.

A still further object is to provide a novel duplex core having novel details of construction permitting two parts to be trimmed simultaneously and satisfactorily.

For an understanding of the inventions hereof, reference will be had to the appended drawings disclosing embodiments of the same.

Fig. 1 is a perspective view of two parts disposed in end to end relation and indicating the edges to be trimmed and the relation to be established;

Fig. 2 is an elevation diagrammatic view of a duplex machine of the invention;

Fig. 3 is a plan view;

Figure 4:
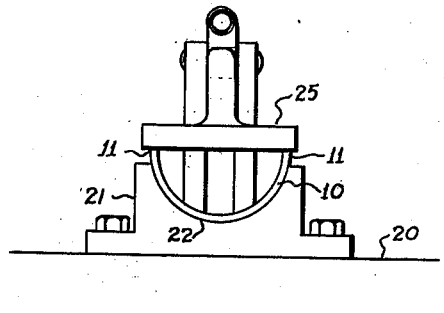
Figure 4A:
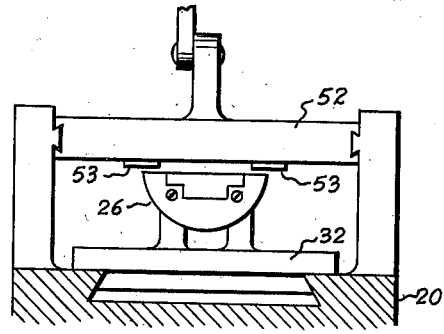
Figure 4B:
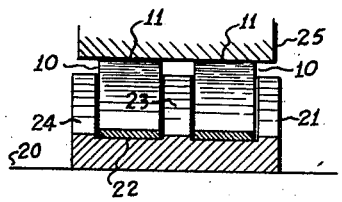
Figures 10, 11:
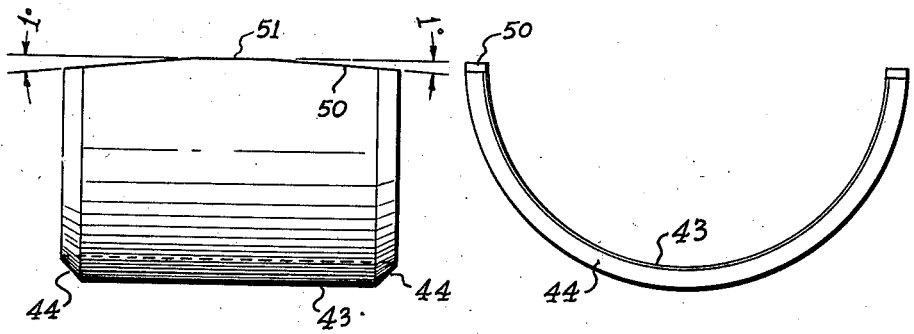
Figure 7:
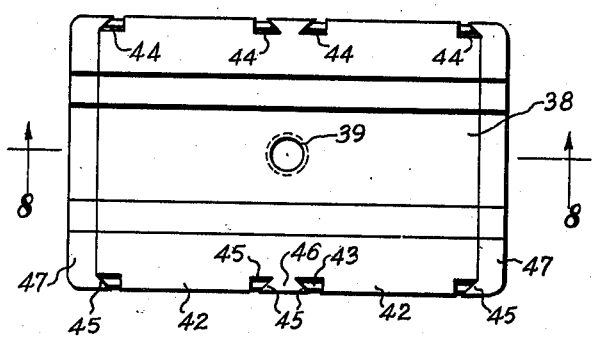
Figure 5:
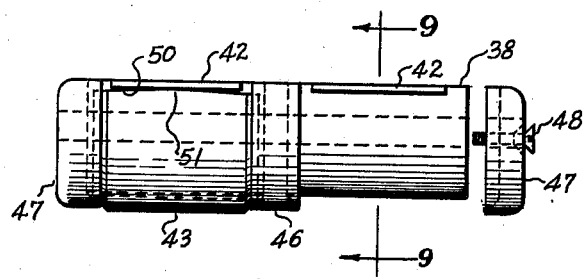
Figure 6:
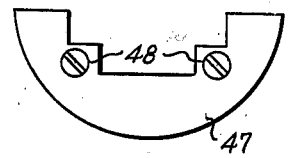
Figure 8:
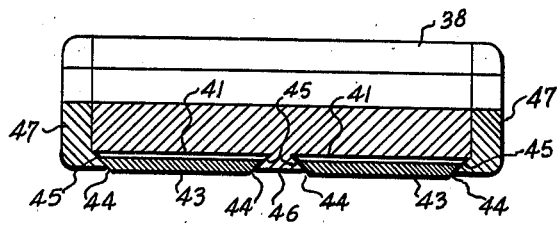
Figure 9:
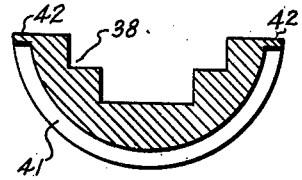

Figs. 4, 4a, and 4b are section views as if on corresponding lines of Fig. 2;

Fig. 5 is an elevation view of a duplex core;

Fig. 6 is an end view and Fig. 7 is a top plan view of the duplex core;

Figs. 8 and 9 are section views on corresponding lines of Figs. 5 and 7;

Figs. 10 and 11 are enlarged views showing a shell rocking characteristic of the core.

Referring to the drawings, it will be seen that the part upon which the operation is to be performed consists of a semi-circular hollow cylinder 10 having elemental edges 11. The function of the machine is to trim these edges to a predetermined dimensional relation with respect to the depth semi-diameter indicated by the dimensional line a, and with respect to the contour of the part when the latter is flexed to that desired contour.

Generally the parts as they come to the machine have the edges extending slightly beyond the desired extent so that the line a is greater than is intended to be the finished dimension and the machine trims these edges down so that line a is as desired, when the part is flexed to be of the desired contour.

By placing two such parts endwise in end to end relation, preferably with a longitudinal space between them, the passing of a single trimmer over the four edges of the two parts will cause these four edges to be trimmed in one operation.

The machine itself consists of a frame 20 having suitable ways and guides and on which is fixedly mounted and rigidly supported a bed block 21 whose upper surface is cylindrically grooved as shown at 22. This groove receives the parts 10 upon which the trimming operation is to be performed. Since two or more parts are to be trimmed simultaneously, the bed is formed long enough to receive as many of the parts as are desired and in the groove between each pair of parts there is provided a semi-circular rib 23 which functions to space adjacent parts longitudinally.

Other ribs 24 are engaged by the ends of the parts for aligning them.

When the parts are placed properly within the groove of the bed their elemental edges project slightly upwardly beyond the upper surface of the bed and the upper edges of the groove. Inasmuch as the placing of a part within the grooved bed does not of itself automatically insure both elemental edges of the part being above the upper face of the bed, there is provided an equalizer 25 in the form of a pivotally mounted manually operable press which may be moved down to engage one or both upper edges of a part and to shift the part as necessary to insure both its edges being above the surface of the bed. The equalizer 25 is manipulated for this purpose at the beginning of an operation and then returned to its normal position out of the way of the core and trimmer now to be described.

The core itself is a block 26 mounted on the forward end of a long rod or shaft 30 pivotally mounted at 31 on a core support 32 which in turn is slidably mounted on the bed or frame of the machine. The rear end of the core shaft is provided with an adjusting means in the nature of a screw arrangement 33, whereby the forward end of the core shaft and the core thereon may be moved downwardly or raised slightly as desired. Means such as the screw arrangement indicated generally at 34 are provided to advance the core support and with it the core towards the bed block and return springs 35 are provided to return the core support and the core as permitted by reverse rotation of the hand wheel 36 on the end of the screw spindle 37 forming part of the core advancing means 34.

The core block 26 consists of a body 38 having a hole 39 through which passes a bolt for securing the core to the end of the core shaft. The outer surface of the body is a semi-circular cylinder and is provided with two wide grooves or recesses 41 extending from near one edge of the core body to near the other, leaving flanges 42 at such edges. Within these grooves are placed shells 43 each in the form of a semi-circular cylinder and each having its ends bevelled as shown at 44 to cooperate with bevels 45 formed in the core body at the ends of the wide grooves or recesses 41 receiving these shells. Two of these bevels 45 are in the rib 46 that separates the two wide grooves.

The other two of these bevels 45 are in the locking plates 47 that are fastened to the ends of the core body by the screws 48 shown. Tightening up of these screws moves the locking plates towards the rib 46 and thus biases the core shells 43 home in the bevelled ends 45 of the grooves or recesses 41 in which they are seated and in this manner the core shells are locked firmly though somewhat loosely in place on the core bodies.

The elemental edges 50 of the core shells are chamfered as shown to the extent of approximately one degree to leave a slight hill 51 in the shell edges and thus to permit a shell to rock slightly with respect to the core body, whereby when a core and its shells are disposed within parts to be clamped by the core and then moved downwardly for the application of clamping pressure, the core shells will adjust themselves to variations in contour of the inner surfaces of the parts to be clamped in the bed block.

Because the core shells shift slightly with respect to the core body which is very rigidly mounted on the frame of the machine, it is possible to utilize a single core for two separate and independent parts 10 in the bed block and thus it is possible to lock and clamp tightly each of the two parts 10 in the bed block without the clamping of one being effected by the clamping of the other. Thus, neither part 10 when being clamped will have its clamping effected by variations in contour of the other part 10.

The use of the core for clamping is as follows:

After the parts 10 are placed in the bed block and are then shifted by the equalizer 25, if and as necessary, the core may be advanced endwise to enter both of the parts in the bed block, such advance being regulated by the screw advancing means 34 for the core. Then the core is moved downwardly by the manipulation of the screw adjuster 33 on the core support so that the core presses tightly against both of the parts 10 in the bed block and the application of core clamping pressure distorts the parts 10 if necessary so that they fit tightly against the groove of the bed.

Thereafter the trimmer 52, which is nothing more than a reciprocating double edged cutter 53 mounted on the frame of the machine, may be caused to advance quickly towards and along the parts 10 in the bed block by means of the cutter advancing means comprising the linkage shown at 54, so that the cutter blades 53 will reciprocate along and trim the elemental edges of the parts 10 in the bed block. Thereafter both the cutter and core are returned by their return springs 35, 55 and the parts 10 in the bed block are lifted out with their edges 11 completely trimmed to the desired dimensional relation.

Now having described the machine herein disclosed and particularly the novel core forming part thereof, reference should be had to the claims which follow for a determination of the inventions hereof.

I claim:

1. A machine for trimming the elemental edges of a member in the form of a semi-circular hollow cylinder to a predetermined dimensional relation with respect to the depth semi-diameter thereof comprising a bed having a cylindrical groove in which may be placed the member, a trimmer for trimming the elemental edges of the member when it is pressed against the groove of the bed, means for relatively moving the trimmer and bed, a core adapted to be placed within the member when the member is within the bed, and means for placing the core within the member and pressing it against the member and thus to press the member against the grooved bed, the core comprising a body having a groove in its outer wall, and a shell adjustably positioned therein and adapted to shift its position slightly, when the core is placed in the member, to compensate for variation in contour of the inner wall of the member, the core and its means for placing it within the member and for pressing it against the member being so constructed that the means advances the core endwise into the member until it is in alignment therewith and then moves the core laterally against the member.

2. A machine for trimming the elemental edges of a member in the form of a semi-circular hollow cylinder to a predetermined dimensional relation with respect to the depth semi-diameter thereof comprising a bed having a cylindrical groove in which may be placed the member, a trimmer for trimming the elemental edges of the member when it is pressed against the groove of the bed, means for relatively moving the trimmer and bed, a core adapted to be placed within the member when the member is within the bed, and means for placing the core within the member and pressing it against the member and thus to press the member against the grooved bed, the core comprising a body having a groove in its outer wall, and a shell adjustably positioned therein and adapted to shift its position slightly, when the core is placed in the member, to compensate for variation in contour of the inner wall of the member, the core with its shell, having an outer surface conforming to the desired inner surface of the member, the core and its means for placing it within the member and for pressing it against the member being so constructed that the means advances the core endwise into the member until it is in alignment therewith and then moves the core laterally against the member.

3. A machine for trimming the elemental edges of two members, each in the form of a semi-circular hollow cylinder, to predetermined dimensional relations with respect to the depth semi-diameters thereof comprising a bed having a cylindrical groove in which may be placed the members in end to end relation, a trimmer for trimming the elemental edges of the members when they are pressed against the groove of the bed, means for relatively moving the trimmer and the bed, a core having a portion adapted to be placed within the members when they are in the bed, and means for placing the core within the members and pressing it against the members and thus to press the members against the grooved bed, the core and its means for placing it within the members and for pressing it against the members being so constructed that the means advances the core endwise into the members until it is in alignment therewith and then moves the core laterally against the members.

4. A machine for trimming the elemental edges of two members, each in the form of a semi-circular hollow cylinder, to predetermined dimensional relations with respect to the depth semi-diameters thereof comprising a bed having a cylindrical groove in which may be placed the members in end to end relation, a trimmer for trimming the elemental edges of the members when they are pressed against the groove of the bed, means for relatively moving the trimmer and the bed, a core having a portion adapted to be placed within the members when they are in the bed, and means for placing the core within the members and pressing it against the members and thus to press the members against the grooved bed, the core comprising a body having grooves in its outer wall, and shells adjustably positioned therein and adapted to shift their positions slightly, when the core is placed in the members, to compensate for variation in contour of the inner walls of the members, the core and its means for placing it within the members and for pressing it against the members being so constructed that the means advances the core endwise into the members until it is in alignment therewith and then moves the core laterally against the members.

5. A core for the purposes described comprising a body having its side wall in the form of a circular cylinder and formed with a long or wide recess in its outer wall extending longitudinally of the body from one end of the body, one end of the recess opening to the end of the body and the other terminating at a rib portion of the body, a thin shell in said recess and of a form and size substantially that of the recess and having one end located at the rib portion of the body and the other end at the end of the body, and an end plate detachably fastened to such end of the body for holding the shell in the recess, the outer side wall of the end plate being of the form of the rib portion of the body.

6. A core for the purposes described comprising a body having its side wall in the form of a circular cylinder and formed with a long or wide recess in its outer wall extending longitudinally of the body from one end of the body, one end of the recess opening to the end of the body and the other terminating at a rib portion of the body, a thin shell in said recess and of a form and size substantially that of the recess and having one end located at the rib portion of the body and the other end at the end of the body, and an end plate detachably fastened to such end of the body for holding the shell in the recess, the outer side wall of the end plate being of the form of the rib portion of the body, the end plate and the rib having on their facing surfaces undercut grooves receiving ends of the shell to interlock the shell and body.

7. A core for the purposes described comprising a body having its side wall in the form of a circular cylinder and formed with a long or wide recess in its outer wall extending longitudinally of the body from one end of the body, one end of the recess opening to the end of the body and the other terminating at a rib portion of the body, a thin shell in said recess and of a form and size substantially that of the recess and having one end located at the rib portion of the body and the other end at the end of the body, and an end plate detachably fastened to such end of the body for holding the shell in the recess, the outer side wall of the end plate being of the form of the rib portion of the body, the end plate and the rib having on their facing surfaces undercut grooves receiving ends of the shell to interlock the shell and body, the undercut grooves and the shell ends being chamfered whereby longitudinal movement of the shell, caused by movement of the end plate towards the body, biases the shell laterally toward the base of the recess in the body.

8. A core for the purposes described comprising a body having its side wall in the form of a circular cylinder and formed with a long or wide recess in its outer wall extending longitudinally of the body from one end of the body, one end of the recess opening to the end of the body and the other terminating at a rib portion of the body, a thin shell in said recess and of a form and size substantially that of the recess and having one end located at the rib portion of the body and the other end at the end of the body, and an end plate detachably fastened to such end of the body for holding the shell in the recess, the outer side wall of the end plate being of the form of the rib portion of the body, the recess terminating near but not at the longitudinal edges of the body to leave laterally projecting flanges thereon against which bear longitudinal edges of the shell.

9. A core for the purposes described comprising a body having its side wall in the form of a circular cylinder and formed with a long or wide recess in its outer wall extending longitudinally of the body from one end of the body, one end of the recess opening to the end of the body and the other terminating at a rib portion of the body, a thin shell in said recess and of a form and size substantially that of the recess and having one end located at the rib portion of the body and the other end at the end of the body, and an end plate detachably fastened to such end of the body for holding the shell in the recess, the outer side wall of the end plate being of the form of the rib portion of the body, the recess terminating near but not at the longitudinal edges of the body to leave laterally projecting flanges thereon against which bear longitudinal edges of the shell, the flanges and the adjacent shell edges being formed to permit such edges to rock on such flanges whereby the shell will shift with respect to the body.

10. A core for the purposes described comprising a body having its side wall in the form of a circular cylinder and formed with a long or wide recess in its outer wall extending longitudinally of the body from one end of the body, one end of the recess opening to the end of the body and the other terminating at a rib portion of the body, a thin shell in said recess and of a form and size substantially that of the recess and having one end located at the rib portion of the body and the other end at the end of the body, and an end plate detachably fastened to such end of the body for holding the shell in the recess, the outer side wall of the end plate being of the form of the rib portion of the body, the recess terminating near but not at the longitudinal edges of the body to leave laterally projecting flanges thereon against which bear longitudinal edges of the shell, the flanges and the adjacent shell edges being formed to permit such edges to rock on such flanges whereby the shell will shift with respect to the body, the end plates and the rib having on their facing surfaces undercut grooves receiving ends of the shell to interlock the shell and body, the undercut grooves and the shell ends being chamfered whereby longitudinal movement of the shell, caused by movement of the end plate towards the body, biases the shell laterally towards the base of the recess in the body.

11. A core for the purposes described comprising a body having its side wall in the form of a circular cylinder and formed with two long or wide recesses in its outer wall extending longitudinally of the body, each opening to an end of the body and each terminating at a rib portion of the body between the recesses, a thin shell in each recess and of a form and size substantially that of the recess and having one end located at the rib portion of the body and the other end at an end of the body, and an end plate detachably fastened to each end of the body for holding each shell in each recess, the outer side wall of each end plate being of the form of the rib.

12. A core for the purposes described comprising a body having its side wall in the form of a circular cylinder and formed with two long or wide recesses in its outer wall extending longitudinally of the body, each opening to an end of the body and each terminating at a rib portion of the body between the recesses, a thin shell in each recess and of a form and size substantially that of the recess and having one end located at the rib portion of the body and the other end at an end of the body, and an end plate detachably fastened to each end of the body for holding each shell in each recess, the outer side wall of each end plate being of the form of the rib, the end plates and the rib having on their facing surfaces undercut grooves receiving ends of the shells to interlock the shells and the body.

13. A core for the purposes described comprising a body having its side wall in the form of a circular cylinder and formed with two long or wide recesses in its outer wall extending longitudinally of the body, each opening to an end of the body and each terminating at a rib portion of the body between the recesses, a thin shell in each recess and of a form and size substantially that of the recess and having one end located at the rib portion of the body and the other end at an end of the body, and an end plate detachably fastened to each end of the body for holding each shell in each recess, the outer side wall of each end plate being of the form of the rib, the end plates and the rib having on their facing surfaces undercut grooves receiving ends of the shells to interlock the shells and the body, the undercut grooves and the shell ends being chamfered whereby longitudinal movement of the shell, caused by movement of the end plate towards the body, biases the shell laterally toward the base of the recess in the body.

14. A core for the purposes described comprising a body having its side wall in the form of a circular cylinder and formed with two long or wide recesses in its outer wall extending longitudinally of the body, each opening to an end of the body and each terminating at a rib portion of the body between the recesses, a thin shell in each recess and of a form and size substantially that of the recess and having one end located at the rib portion of the body and the other end at an end of the body, and an end plate detachably fastened to each end of the body for holding each shell in each recess, the outer side wall of each end plate being of the form of the rib, each recess terminating near but not at the longitudinal edges of the body to leave laterally projecting flanges thereon against which bear longitudinal edges of the shell.

15. A core for the purposes described comprising a body having its side wall in the form of a circular cylinder and formed with two long or wide recesses in its outer wall extending longitudinally of the body, each opening to an end of the body and each terminating at a rib portion of the body between the recesses, a thin shell in each recess and of a form and size substantially that of the recess and having one end located at the rib portion of the body and the other end at an end of the body, and an end plate detachably fastened to each end of the body for holding each shell in each recess, the outer side wall of each end plate being of the form of the rib, each recess terminating near but not at the longitudinal edges of the body to leave laterally projecting flanges thereon against which bear longitudinal edges of the shell, the flanges and the adjacent shell edges being formed to permit such edges to rock on such flanges whereby the shell will shift with respect to the body.

16. A core for the purposes described comprising a body having its side wall in the form of a circular cylinder and formed with two long or wide recesses in its outer wall extending longitudinally of the body, each opening to an end of the body and each terminating at a rib portion of the body between the recesses, a thin shell in each recess and of a form and size substantially that of the recess and having one end located at the rib portion of the body and the other end at an end of the body, and an end plate detachably fastened to each end of the body for holding each shell in each recess, the outer side wall of each end plate being of the form of the rib, the recess terminating near but not at the longitudinal edges of the body to leave laterally projecting flanges thereon against which bear longitudinal edges of the shell, the flanges and the adjacent shell edges being formed to permit such edges to rock on such flanges whereby the shell will shift with respect to the body, the end plates and the rib having on their facing surfaces undercut grooves receiving ends of the shells to interlock the shells and the body, the undercut grooves and the shell ends being chamfered whereby longitudinal movement of the shell, caused by movement of the end plate towards the body, biases the shell laterally toward the base of the recess in the body.

17. A work holder for the purposes described comprising a base section and a core section, the latter comprising a body having its side wall in the form of a semi-circular cylinder and formed with a long or wide recess in its outer surface extending longitudinally of the body from one end of the body, one end of the recess opening to one end of the body and the other terminating short of the other end of the body to provide at such end of the recess a rib portion for the body, a thin shell in said recess and of a form and size substantially that of the recess and having one end located at the rib portion of the body and the other end at the end of the body, and an end plate detachably fastened to such end of the body for holding the shell in the recess, the outer side surface of the end plate being of the form of the rib portion of the body, the shell being movable with respect to the body to permit relative movement of the body and the work within which the holder may be placed, with the shell engaging the work.

18. A work holder for the purposes described comprising a base section and a core section, the latter comprising a body having its side wall in the form of a semi-circular cylinder and formed with a long or wide recess in its outer surface extending longitudinally of the body from one end of the body, one end of the recess opening to one end of the body and the other terminating short of the other end of the body to provide at such end of the recess a rib portion for the body, a thin shell in said recess end of a form and size substantially that of the recess and having one end located at the rib portion of the body and the other end at the end of the body, and an end plate detachably fastened to such end of the body for holding the shell in the recess, the outer side surface of the end plate being of the form of the rib portion of the body, the shell being movable with respect to the body to permit relative movement of the body and the work within which the holder may be placed, with the shell engaging the work, the end plate and the rib having on their facing surfaces undercut grooves receiving ends of the shell to interlock the shell and body.

19. A work holder for the purposes described comprising a base section and a core section, the latter comprising a body having its side wall in the form of a semi-circular cylinder and formed with a long or wide recess in its outer surface extending longitudinally of the body from one end of the body, one end of the recess opening to one end of the body and the other terminating short of the other end of the body to provide at such end of the recess a rib portion for the body, a thin shell in said recess and of a form and size substantially that of the recess and having one end located at the rib portion of the body and the other end at the end of the body, and an end plate detachably fastened to such end of the body for holding the shell in the recess, the outer side surface of the end plate being of the form of the rib portion of the body, the shell being movable with respect to the body to permit relative movement of the body and the work within which the holder may be placed, with the shell engaging the work, the end plate and the rib having on their facing surfaces undercut grooves receiving ends of the shell to interlock the shell and body, the undercut grooves and the shell ends being chamfered whereby longitudinal movement of the shell, caused by movement of the end plate towards the body, biases the shell laterally toward the base of the recess in the body.

20. A work holder for the purposes described comprising a base section and a core section, the latter comprising a body having its side wall in the form of a semi-circular cylinder and formed with a long or wide recess in its outer surface extending longitudinally of the body from one end of the body, one end of the recess opening to one end of the body and the other terminating short of the other end of the body to provide at such end of the recess a rib portion for the body, a thin shell in said recess and of a form and size substantially that of the recess and having one end located at the rib portion of the body and the other end at the end of the body, and an end plate detachably fastened to such end of the body for holding the shell in the recess, the outer side surface of the end plate being of the form of the rib portion of the body, the shell being movable with respect to the body to permit relative movement of the body and the work within which the holder may be placed, with the shell engaging the work, the recess terminating near but not at the longitudinal edges of the body to leave laterally projecting flanges thereon against which bear longitudinal edges of the shell.

21. A work holder for the purposes described comprising a base section and a core section, the latter comprising a body having its side wall in the form of a semi-circular cylinder and formed with a long or wide recess in its outer surface extending longitudinally of the body from one end of the body, one end of the recess opening to one end of the body and the other terminating short of the other end of the body to provide at such end of the recess a rib portion for the body, a thin shell in said recess and of a form and size substantially that of the recess and having one end located at the rib portion of the body and the other end at the end of the body, and an end plate detachably fastened to such end of the body for holding the shell in the recess, the outer side surface of the end plate being of the form of the rib portion of the body, the shell being movable with respect to the body to permit relative movement of the body and the work within which the holder may be placed with the shell engaging the work, the recess terminating near but not at the longitudinal edges of the body to leave laterally projecting flanges thereon against which bear longitudinal edges of the shell, the flanges and the adjacent shell edges being formed to permit such edges to rock on such flanges whereby the shell will shift with respect to the body.

22. A work holder for the purposes described comprising a base section and a core section, the latter comprising a body having its side wall in the form of a semi-circular cylinder and formed with a long or wide recess in its outer surface extending longitudinally of the body from one end of the body, one end of the recess opening to one end of the body and the other terminating short of the other end of the body to provide at such end of the recess a rib portion for the body, a thin shell in said recess and of a form and size substantially that of the recess and having one end located at the rib portion of the body and the other end at the end of the body, and an end plate detachably fastened to such end of the body for holding the shell in the recess, the outer side surface of the end plate being of the form of the rib portion of the body, the shell being movable with respect to the body to permit relative movement of the body and the work within which the holder may be placed, with the shell engaging the work, the recess terminating near but not at the longitudinal edges of the body to leave laterally projecting flanges thereon against which bear longitudinal edges of the shell, the flanges and the adjacent shell edges being formed to permit such edges to rock on such flanges whereby the shell will shift with respect to the body, the end plate and the rib having on their facing surfaces undercut grooves receiving ends of the shell to interlock the shell and body, the undercut grooves and the shell ends being chamfered whereby longitudinal movement of the shell, caused by movement of the end plate towards the body, biases the shell laterally towards the base of the recess in the body.

23. A work holder for the purposes described comprising a base section and a core section, the latter comprising a body having its side wall in the form of a semi-circular cylinder and formed with two long or wide recesses in its outer surface extending longitudinally of the body, each opening to an end of the body and both being longitudinally spaced to define a rib portion of the body between the recesses, a thin shell in each recess and of a form and size substantially that of the recess and having one end located at the rib portion of the body and the other end at an end of the body, and an end plate detachably fastened to each end of the body for holding each shell in each recess, the outer side surface of each end plate being of the form of the rib, the shells being movable with respect to the body to permit relative movement of the body and the work within which the holder may be placed, with the shells engaging the work.

24. A work holder for the purposes described comprising a base section and a core section, the latter comprising a body having its side wall in the form of a semi-circular cylinder and formed with two long or wide recesses in its outer surface extending longitudinally of the body, each opening to an end of the body and both being longitudinally spaced to define a rib portion of the body between the recesses, a thin shell in each recess and of a form and size substantially that of the recess and having one end located at the rib portion of the body and the other end at an end of the body, and an end plate detachably fastened to each end of the body for holding each shell in each recess, the outer side surface of each end plate being of the form of the rib, the shells being movable with respect to the body to permit relative movement of the body and the work within which the holder may be placed, with the shells engaging the work, the end plates and the rib having on their facing surfaces undercut grooves receiving ends of the shells to interlock the shells and the body.

25. A work holder for the purposes described comprising a base section and a core section, the latter comprising a body having its side wall in the form of a semi-circular cylinder and formed with two long or wide recesses in its outer surface extending longitudinally of the body, each opening to an end of the body and both being longitudinally spaced to define a rib portion of the body between the recesses, a thin shell in each recess and of a form and size substantially that of the recess and having one end located at the rib portion of the body and the other end at an end of the body, and an end plate detachably fastened to each end of the body for holding each shell in each recess, the outer side surface of each end plate being of the form of the rib, the shells being movable with respect to the body to permit relative movement of the body and the work within which the holder may be placed, with the shells engaging the work, the end plates and the rib having on their facing surfaces undercut grooves receiving ends of the shells to interlock the shells and the body, the undercut grooves and the shell ends being chamfered whereby longitudinal movement of a shell, caused by movement of an end plate towards the body, biases the shell laterally toward the base of the recess in the body.

26. A work holder for the purposes described comprising a base section and a core section, the latter comprising a body having its side wall in the form of a semi-circular cylinder and formed with two long or wide recesses in its outer surface extending longitudinally of the body, each opening to an end of the body and both being longitudinally spaced to define a rib portion of the body and the other end at an end of the body, a thin shell in each recess and of a form and size substantially that of the recess and having one end located at the rib portion of the body and the other end at an end of the body, and an end plate detachably fastened to each end of the body for holding each shell in each recess, the outer side surface of each end plate being of the form of the rib, the shells being movable with respect to the body to permit relative movement of the body and the work within which the holder may be placed, with the shells engaging the work, each recess terminating near but not at the longitudinal edges of the body to leave laterally projecting flanges thereon against which bear longitudinal edges of each shell.

27. A work holder for the purposes described comprising a base section and a core section, the latter comprising a body having its side wall in the form of a semi-circular cylinder and formed with two long or wide recesses in its outer surface extending longitudinally of the body, each opening to an end of the body and both being longitudinally spaced to define a rib portion of the body between the recesses, a thin shell in each recess and of a form and size substantially that of the recess and having one end located at the rib portion of the body and the other end at an end of the body, and an end plate detachably fastened to each end of the body for holding each shell in each recess, the outer side surface of each end plate being of the form of the rib, the shells being movable with respect to the body to permit relative movement of the body and the work within which the holder may be placed, with the shells engaging the work, each recess terminating near but not at the longitudinal edges of the body to leave laterally projecting flanges thereon against which bear longitudinal edges of each shell, the flanges and the adjacent shell edges being formed to permit such edges to rock on such flanges whereby each shell will shift with respect to the body.

28. A work holder for the purposes described comprising a base section and a core section, the latter comprising a body having its side wall in the form of a semi-circular cylinder and formed with two long or wide recesses in ts outer surface extending longitudinally of the body, each opening to an end of the body and both being longitudinally spaced to define a rib portion of the body between the recesses, a thin shell in each recess and of a form and size substantially that of the recess and having one end located at the rib portion of the body and the other end at an end of the body, and an end plate detachably fastened to each end of the body for holding each shell in each recess, the outer side surface of each end plate being of the form of the rib, the shells being movable with respect to the body to permit relative movement of the body and the work within which the holder may be placed, with the shells engaging the work, each recess terminating near but not at the longitudinal edges of the body to leave laterally projecting flanges thereon against which bear longitudinal edges of each shell, the flanges and the adjacent shell edges being formed to permit such edges to rock on such flanges whereby each shell will shift with respect to the body, the end plates and the rib having on their facing surfaces undercut grooves, receiving ends of the shells to interlock the shells and the body, the undercut grooves and the shell ends being chamfered whereby longitudinal movement of a shell, caused by movement of an end plate towards the body, biases the shell laterally toward the base of the recess in the body.

BENJAMIN PHILIP ROBERTS.